United States Patent Office 3,298,723
Patented Jan. 17, 1967

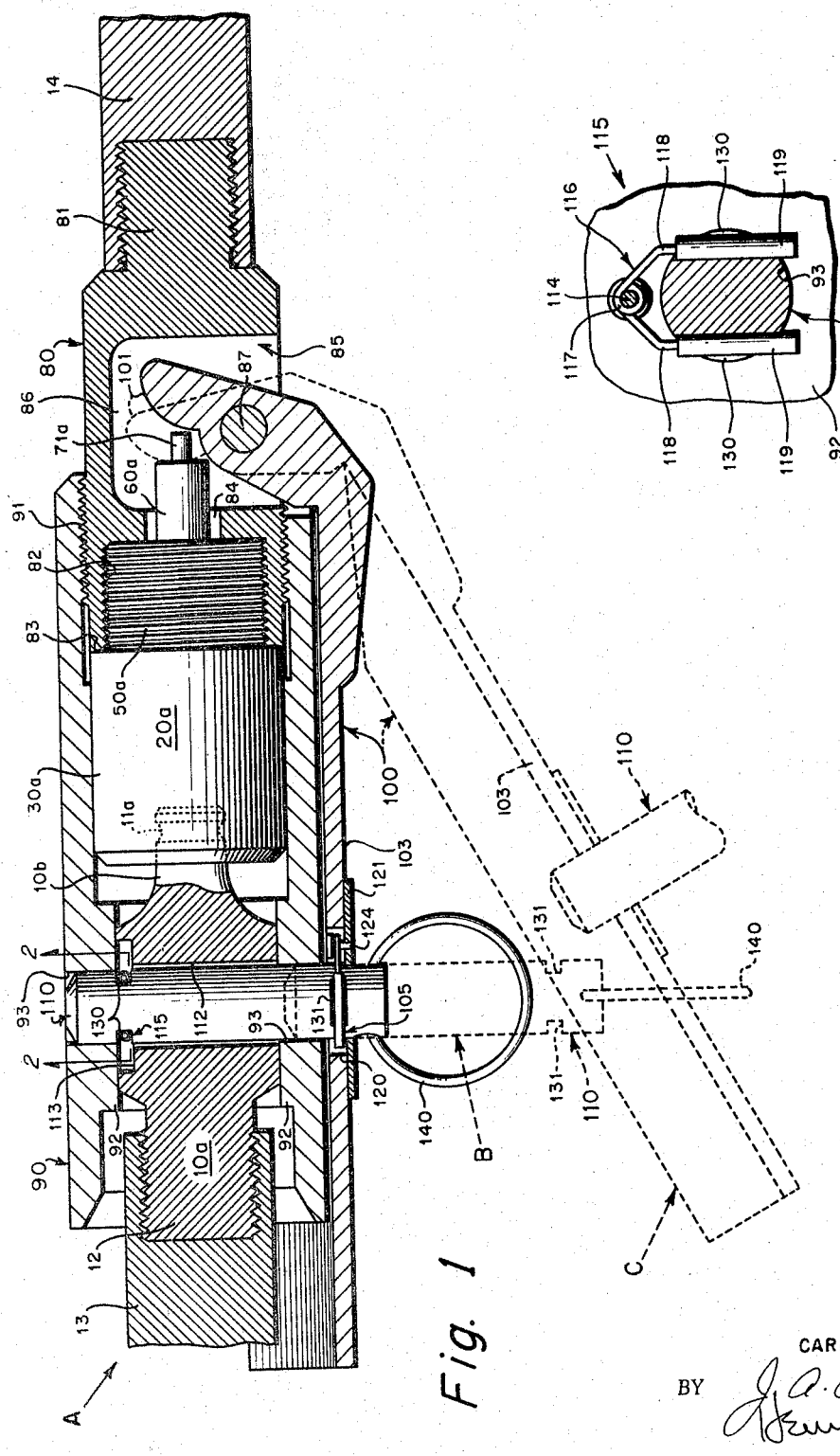

3,298,723
MECHANICAL COUPLING
Carl A. Damm, Upper Black Eddy, Pa., assignor to the United States of America as represented by the Secretary of the Navy
Filed June 24, 1964, Ser. No. 377,778
7 Claims. (Cl. 287—119)

The invention described herein may be manufactured or used by or for the Government of the United States of America for governmental purposes without the payment of any royalties thereon or therefor.

The present invention relates to a mechanical coupling for rods and the like and more particularly to a mechanical coupling which can be released under high axial and non-axial load.

In catapult launching of aircraft from an aircraft carrier a tow bar is interposed and interconnected between a shuttle and the nose wheel of the aircraft to be launched. In order to restrain the aircraft from movement until the steam pressure acting on the shuttle and the power developed by the aircraft propulsion plant is at a predetermined launching level a trail bar is interconnected between the nose wheel of the aircraft and the deck of the carrier. A shear pin is interposed within the trail bar structure and is set to break at a predetermined loading which is obtained from the aircraft power and the catapult steam pressure acting on the shuttle. Prior to launching, the catapult is properly tensioned by an application of hydraulic pressure to the shuttle which through the tow bar attached thereto and the trail bar urges the nose wheel downwardly toward the aircraft carrier deck. In present launching systems once the catapult has been properly tensioned the pressure cannot be relieved. In order to permit the aircraft to be removed from the catapult station and the launch aborted for the various reasons that might arise, there exists a need for a coupling with the trail bar structure which may be released under the high loads applied thereto in a rapid and safe manner.

It is an object of the present invention to alleviate the aforesaid problems and provide a coupling which may be released under load in a rapid and safe manner.

An additional object of the present invention is to provide a coupling which may be released under load and wherein a safety device is included to continue the structural integrity of the unit should the connector fail during launching.

A still further object of the present invention is to provide a coupling which may be released under load and which may be released by the actuation of a single universal control lever.

A still further object of the present invention is to provide a coupling which may be released under load and which can be positioned at any angle or location for ease of operation and wherein there are no loose parts which may become lost or misplaced.

An additional object of the present invention is to provide an inexpensive coupling which may be actuated under load and which is easily operated and which has exceptionally high strength capabilities.

These and other objects and features of the invention will become apparent to those skilled in the art as the disclosure is made in the following description of an embodiment of the invention as illustrated in the accompanying sheet of drawing in which:

FIG. 1 represents a longitudinal cross-sectional view of the coupling; and

FIG. 2 is a cross-sectional view taken along the lines 2—2 of FIG. 1.

Referring now to FIG. 1, it may be seen that the coupling device A of the present invention generally comprises a lock-on stud assembly 10a, a lock-on connector generally indicated by the reference number 20a, a receiver 80, an aligning barrel generally noted at 90, and a control lever 100.

The lock-on stud 10a comprises a neck 10b having an annular groove 11a formed at the end thereof for receiving lip portions of a sprag assembly, not shown, which are elements of the lock-on connector 20a. The operation of the lock-on connector 20a and especially the sprag assembly is found in detail in patent No. 3,043,614 granted to A. C. Eichmann on July 10, 1962 and in Patent No. 3,121,583 granted to C. A. Damm on February 18, 1964.

In this embodiment, as in the aforesaid patents, the semicircular lip portions of the sprag assembly, not shown, abuts and closely interfits the angular groove 11a formed in stud 10a and are held in this position by the abutment of the other lip portions of the sprag assembly against the end portion of a plunger assembly 60a received within hollow shaft or connector barrel 50a. As described in the aforesaid patents, when it is desired to release stud 10a, an operating member 71a is depressed against the bias of a spring, not shown. Subsequently, plunger assembly 60a is free to travel abruptly in the direction of stud 10a in response to a force applied to the plunger by a spring, not shown. For a more detailed description of the operation of this device reference is made to the aforesaid mentioned patents.

Lock-on stud 10a is formed with an externally threaded reduced end portion 12 for threadable engagement with a rod 13 which is one of the elements to be coupled by the present invention. Rod 14 threadably engages receiver 80 and is thereby coupled to rod 13 by the interposed releasable coupling assembly A. It should be understood that it is within the contemplation of the present invention that elements 13 and 14 may be either rods and/or pipes which may be joined to the coupling assembly A by any appropriate means.

As indicated above, receiver 80 includes a reduced neck portion 81 formed for threadable connection to rod 14 and additionally includes an internally threaded portion 82 formed for threadably receiving the connector barrel 50a of the connector 20a. The connector cap 30a of the connector 20a abuts the shoulder 83 of receiver 80 and may be precluded from rotation with respect thereto by any appropriate means such as a locking ring having tangs engaging both the receiver 80 and the connector cap 30a. An axial bore 84 formed in receiver 80 permits plunger assembly 60a and operating member 71a to extend within a longitudinally and axially extending slot 85 formed in the receiver 80. The side walls 86 forming the slot 85 have a transverse pivot pin member 87 mounted thereon which serves to pivotally connect the control lever 100 to the receiver 80. Lever 100 will be discussed in greater detail below.

The aligning barrel 90 surrounds and houses the stud 10a, connector 20a and is threadably connected at 91 to one end of receiver 80. Diametrically opposed reinforced sections 92 are formed intermediate the length of the aligning barrel 90 and aligned transverse openings 93 formed for receiving a safety pin 110 which will be described in greater detail below.

Lever 100, which as indicated above, is pivotally connected to the sidewalls 86 of the receiver 80, includes a releasing cam portion 101 at one end thereof for engaging and depressing operating member 71a which in turn releases the lip portions of the sprag assembly from groove 11a of stud 10a. Lever 100 further includes a handle 103 which houses and supports a spring catch assembly generally noted at 105 intermediate the length thereof for restraining safety pin 110.

Stud 10a is formed with an aperture 112 extending transversely therethrough for also slidably receiving pin 110 and a flat shoulder portion 113 having a pin 114 fastened thereto for pivotally connecting a second spring catch assembly generally noted at 115. See particularly FIG. 2. Spring catch assembly 115 is formed of a unitary spring member 116 having a coiled, intermediate portion 117 which engages the pivot pin 114 and end portions 118 which converge when the spring 116 is at rest. The end portions 118 are formed with tubular members 119 fastened thereto.

Handle 103 is further formed with an enlarged aperture 120 which is in coaxial alignment with the apertures 93 formed in the aligning barrel 90 and aperture 112 in stud 10a. A plate 121 having a corresponding aperture therethrough for slidably receiving pin 110 contains a pivot pin 124 for supporting the spring catch assembly 105 adjacent the aperture 120 formed in the handle 103. Spring catch assembly 105 is substantially identical in form to that described and shown in FIG. 2 and further description thereof is not considered necessary.

Safety pin 110 has a forward pair of segmental slots 130 formed at the upper portion thereof and a complementary pair of slots 131 formed at a lower portion thereof. The slots 130 and 131 formed in safety pin 110 are adapted to receive the tubular portions 119 of spring catch assemblies 115 and 105, respectively, and are additionally perpendicularly oriented with respect to each other. A ring pull 140 is secured to the end of the safety pin in any appropriate manner and is utilized to impart a twisting and pulling motion to the pin 110.

As shown in the solid-line, locked position of FIG. 1, lever 100 is locked around the barrel 90 by reason of the engagement of the spring catch assemblies 105 and 115 within slots 131 and 130, respectively. In this position the safety pin 110 passes through the oversized hole in stud 10a and the two aforesaid spring catches provide a double safety feature to keep lever 100 and safety pin 110 secure thereby providing protection against premature opening and uncoupling of rods 13 and 14.

In order to release the connector 20a from stud 10a and thereby uncouple rods 13 and 14 from the solid line positions of FIG. 1, the operator grips ring pull 140 and imparts a 90 degree rotation to the pin 110 thereby causing springs 130 to be cammed open and permitting pin 110 to be pulled outwardly.

Safety pin 110 is pulled straight back to the limit thereof which occurs when spring catch assembly 105 engages the forward pair of segmental slots 130. This position is illustrated by the dotted line position B of FIG. 1 and and it may be seen that the safety pin 110 has been retracted from within the stud 10a. Continuation of a pulling force moves lever 100 to a position C whereby cam surface 101 engages operating member 71a thereby actuating connector 20a and releasing stud 10a therefrom.

It may be seen that the present embodiment permits one source of actuation control and that all parts of the device are maintained as an integral unit. It should be noted, however, that pin 110 may be removed from handle 103 by rotating pin 110 ninety degrees thereby camming open the spring catch 105 and permitting removal. It may also be noted that subsequent to the uncoupling of rods 13 and 14, the coupling assembly A may be easily threadably disengaged from rod 14 by utilizing lever 100 as a wrench to rotate assembly A about the rod 14.

Obviously, many modifications and variations of the present invention are possible in light of the above teaching. It is, therefore, to be understood that, within the scope of the appended claims, the invention may be practiced otherwise than as specifically described.

What is claimed is:

1. A mechanical device for coupling a plurality of elements and being releasable under load, comprising:
    male and female connecting units, said female connecting unit being releasably connected with said male unit and having protruding therefrom an operating detent member movable relative thereto and operable for causing said female connecting unit to release said male connecting unit, and said male unit having an aperture extending transversely therethrough,
    first means connected to said female connecting unit and to one of the elements to be coupled, second means connected to said male connecting unit and to the other of the elements to be coupled,
    actuating means extending adjacent said male connecting unit, including a cam portion and pivotally connected to said first means for movement of said cam portion relative to and into engagement with said operating detent member, said actuating means being selectively movable from a latched position causing said cam portion to engage and operate said operating detent member,
    and movable pin means yieldably attached to said actuating means so as to be movable relative thereto and positioned to extend through said aperture in said male unit for restraining said actuating means from movement from said latched position, said pin means being withdrawable from said male connecting unit to permit movement of said actuating means from said latched position.

2. The mechanical device as defined in claim 1 wherein said female connecting unit includes:
    a cap having a cylindrical bore therein terminating at one end in an aperture smaller than said bore,
    a fastening assembly received within said cap adjacent said aperture,
    and attachment means on said female connecting unit at the end remote from said aperture securing said unit to said first means.

3. The mechanical device as defined in claim 2 wherein said male connecting unit includes:
    a neck portion formed at one end thereof,
    an annular groove formed in said neck portion at the end thereof, said groove being releasably engaged by said fastening assembly,
    and attachment means on said male connecting unit at the end remote from said neck portion for securing said male unit to said other of the elements to be coupled.

4. The mechanical device as defined in claim 3 further including:
    an aligning barrel connected to said first means encompassing said male and female connecting units and interposed between said actuating means and said male and female connecting units,
    said aligning barrel having diametrically opposed apertures in alignment with said aperture in said male connecting unit when said unit is connected with said female unit,
    and said pin means extending through said apertures in said aligning barrel and said male connecting unit.

5. The mechanical device as defined in claim 4 wherein:
    said actuating means comprises lever means,
    said first means is threadably secured at one end thereof to said attachment means on said female connecting unit and is threadably secured at the other end thereof to said one of the elements to be coupled,
    and further is piovtally connected to said lever means and has a slot formed therein for receiving said operating detent member and said cam portion.

6. The mechanical device as defined in claim 5 wherein said pin means includes:
    forward diametrically opposed segmental slots formed forwardly of said pin, and perpendicularly related, diametrically opposed segmental slots formed rearwardly of said pin, first spring means secured to said male connecting unit adjacent the aperture therethrough for engaging said forward segmental slots, and second spring means secured to said lever means for engaging said rearward segmental slots; whereby rotation of said pin means will cam said first and second spring means out of engagement with said forward and rearward slots thereby allowing withdrawal of said pin means from said apertures formed in said aligning barrel and said male member; and whereby continued withdrawal of said locking pin means causes said second spring means to engage said forward slots thereby causing said lever to pivot and actaute said female connecting unit upon continued withdrawal of said locking pin.

7. A mechanical device for coupling a plurality of elements and being releasable under load, comprising:

male and female connecting units, said female connecting unit being releasably connected with said male unit and having protruding therefrom an operating detent member movable relative thereto and operable for causing said female connecting unit to release said male connecting unit, and said male unit having an aperture extending transversely therethrough;

first means connected to said female unit and to one of the elements to be coupled;

second means connected to said male connecting unit and to the other of the elements to be coupled;

lever means extending adjacent said male connecting unit, including a cam portion and pivotally connected to said first means for movement of said cam portion relative to and into engagement with said operating detent member, said lever means being selectively movable from a latched position causing said cam portion to engage and operate said operating detent member;

an aligning barrel connected to said first means, encompassing said male and female connecting units and interposed between said lever means and said male and female connecting units, said aligning barrel having diametrically opposed apertures in alignment with said aperture in said male connecting unit when said unit is connected with said female unit;

and movable pin means yieldingly attached to said lever means so as to be movable relative thereto and positioned to extend through said apertures in said aligning barrel and in said male unit for restraining said lever means from movement from said latched position, said pin means being withdrawable from said male connecting unit to permit movement of said lever means from said latched position.

References Cited by the Examiner

UNITED STATES PATENTS

| | | | |
|---|---|---|---|
| 732,048 | 6/1903 | Coburn | 279—77 |
| 1,851,843 | 3/1932 | Inman | 287—119 |
| 1,954,048 | 4/1934 | Jeffrey et al. | |
| 2,933,795 | 4/1960 | Meeker | 24—230.1 |
| 3,043,614 | 7/1962 | Eichmann | 287—119 |

CARL W. TOMLIN, *Primary Examiner.*

A. V. KUNDRAT, *Assistant Examiner.*